United States Patent
Annampedu et al.

(10) Patent No.: US 9,305,581 B2
(45) Date of Patent: Apr. 5, 2016

(54) SYSTEMS AND METHODS FOR MEMORY EFFICIENT REPEATABLE RUN OUT PROCESSING

(75) Inventors: Viswanath Annampedu, Schnecksville, PA (US); Terence Karanink, Center Valley, PA (US); Xun Zhang, Westford, MA (US); Jeffrey P. Grundvig, Loveland, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 319 days.

(21) Appl. No.: 12/328,024

(22) Filed: Dec. 4, 2008

(65) Prior Publication Data

US 2010/0142078 A1    Jun. 10, 2010

(51) Int. Cl.
G11B 5/596    (2006.01)

(52) U.S. Cl.
CPC .................................. *G11B 5/59627* (2013.01)

(58) Field of Classification Search
None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |

(Continued)

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Daniell L Negron (57) ABSTRACT

Various embodiments of the present invention provide systems and methods for low overhead disk wobble compensation. As an example, a method for performing synchronous wobble compensation processing is disclosed. The method includes providing a medium that includes a servo data region and a user data region. The servo data region includes a clock recovery pattern and a location pattern. A detectable pattern is written to the user data region a known number of bit periods from the location pattern. The detectable pattern is read back, and a fractional processing delay is calculated. Based at least on the fractional processing delay and a known number of bit periods from the location pattern to the end of the servo data region, a wobble compensation pattern is written an integral number of bit periods from the location pattern.

27 Claims, 7 Drawing Sheets

(56) References Cited

U.S. PATENT DOCUMENTS

| | | | |
|---|---|---|---|
| 6,081,397 | A | 6/2000 | Belser |
| 6,111,712 | A | 8/2000 | Vishakhadatta et al. |
| 6,208,478 | B1 | 3/2001 | Chiu et al. |
| 6,278,591 | B1 | 8/2001 | Chang |
| 6,400,518 | B1 | 6/2002 | Bhaumik et al. |
| 6,404,829 | B1 | 6/2002 | Sonu |
| 6,441,661 | B1 | 8/2002 | Aoki et al. |
| 6,490,110 | B2 | 12/2002 | Reed et al. |
| 6,493,162 | B1 | 12/2002 | Fredrickson |
| 6,519,102 | B1 | 2/2003 | Smith |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,633,447 | B2 | 10/2003 | Franck et al. |
| 6,646,822 | B1 | 11/2003 | Tuttle et al. |
| 6,657,802 | B1 | 12/2003 | Ashley et al. |
| 6,775,529 | B1 | 8/2004 | Roo |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B2 | 11/2005 | Hayashi |
| 6,999,257 | B2 | 2/2006 | Takeo |
| 6,999,264 | B2 | 2/2006 | Ehrlich |
| 7,002,767 | B2 | 2/2006 | Annampedu et al. |
| 7,038,875 | B2 | 5/2006 | Lou et al. |
| 7,072,137 | B2 | 7/2006 | Chiba |
| 7,082,005 | B2 | 7/2006 | Annampedu et al. |
| 7,092,462 | B2 | 8/2006 | Annampedu et al. |
| 7,116,504 | B1 | 10/2006 | Oberg |
| 7,126,776 | B1 | 10/2006 | Warren, Jr. et al. |
| 7,136,250 | B1 | 11/2006 | Wu et al. |
| 7,154,689 | B1 | 12/2006 | Shepherd et al. |
| 7,167,328 | B2 | 1/2007 | Annampedu et al. |
| 7,180,693 | B2 | 2/2007 | Annampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,199,961 | B1 | 4/2007 | Wu et al. |
| 7,203,013 | B1 | 4/2007 | Han et al. |
| 7,206,146 | B2 | 4/2007 | Flynn et al. |
| 7,230,789 | B1 | 6/2007 | Brunnett et al. |
| 7,253,984 | B1 | 8/2007 | Patapoutian et al. |
| 7,301,717 | B1 | 11/2007 | Lee et al. |
| 7,308,057 | B1 | 12/2007 | Patapoutian |
| 7,362,536 | B1 | 4/2008 | Liu et al. |
| 7,375,918 | B1 | 5/2008 | Shepherd et al. |
| 7,411,531 | B2 | 8/2008 | Aziz et al. |
| 7,420,498 | B2 | 9/2008 | Barrenscheen |
| 7,423,827 | B2 | 9/2008 | Neville et al. |
| 7,446,690 | B2 | 11/2008 | Kao |
| 7,499,238 | B2 | 3/2009 | Annampedu |
| 7,602,568 | B1 * | 10/2009 | Katchmart .................. 360/51 |
| 7,620,101 | B1 | 11/2009 | Jenkins |
| 7,630,155 | B2 * | 12/2009 | Maruyama et al. ............ 360/48 |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2002/0181377 | A1 | 12/2002 | Nagata et al. |
| 2003/0095350 | A1 | 5/2003 | Annampedu et al. |
| 2005/0046982 | A1 | 3/2005 | Liu et al. |
| 2005/0157415 | A1 | 7/2005 | Chiang |
| 2005/0243455 | A1 | 11/2005 | Annampedu |
| 2007/0071152 | A1 | 3/2007 | Chen et al. |
| 2007/0104300 | A1 | 5/2007 | Esumi et al. |
| 2007/0183073 | A1 | 8/2007 | Sutardja et al. |
| 2007/0230015 | A1 | 10/2007 | Yamashita |
| 2007/0263311 | A1 | 11/2007 | Smith |
| 2008/0080082 | A1 | 4/2008 | Erden et al. |
| 2008/0212715 | A1 | 9/2008 | Chang |
| 2008/0266693 | A1 | 10/2008 | Bliss et al. |
| 2009/0002862 | A1 | 1/2009 | Park |
| 2009/0142620 | A1 | 6/2009 | Yamamoto et al. |

OTHER PUBLICATIONS

Aziz and Annampedu, "Asynchronous Maximum Likelihood (ML) Detection of Servo repeatable Run Out (RRO) Data".

Aziz, P. et al, "Interpolation Based Maximum-Likelihood (ML) Detection of Asynchronous Servo Repeatable Run Out (RRO) Data," Digest, IEEE Intnl. Magnetics Conf. May 2006.

Aziz, P. et al, "Interpolation Based Maximum-Likelihood (ML) Detection of Asynchronous Servo Repeatable Run Out (RRO) Data," vol. 42, No. 10, pp. 2585-2587, Oct. 2006.

* cited by examiner

SYSTEMS AND METHODS FOR MEMORY EFFICIENT REPEATABLE RUN OUT PROCESSING

BACKGROUND OF THE INVENTION

The present inventions are related to detection of data in a communication system, and more particularly to detection of servo repeatable run out information from a channel.

A read channel integrated circuit is a component of a magnetic storage device. In operation, a read channel component converts and encodes data to enable read/write head assembly to write data to a disk and then read back the data accurately. In, for example, a hard disk drive, the disk typically includes many tracks containing encoded data that extend around the disk in a radial pattern. Each track includes one or more of user data sectors as well as intervening servo data sectors. The information of the servo data sectors is used to position the read/write head assembly in relation to the disks so that the information stored in the user data sectors may be retrieved accurately.

Repeatable run out (RRO) refers to a phenomenon that occurs due to imperfect spindles. Imperfect spindles might not allow the disk to spin in an exact circle around the disk's center. If the disk is not rotating at the center, the track rotating under the head does not follow a circular trajectory, and hence the head might not be able to read the servo information properly. A similar phenomenon occurs when spindle imperfections were present at the time the servo information was written to the disk. Even though the disk may spin properly in a different hard disk drive while reading the servo information, since the information was not written properly on a circular track, the head might not be able to read the servo information accurately. Thus, there is a need for a mechanism to properly guide the head to follow the trajectory of the track. A RRO data field in the servo information serves this purpose.

Figure 1A:
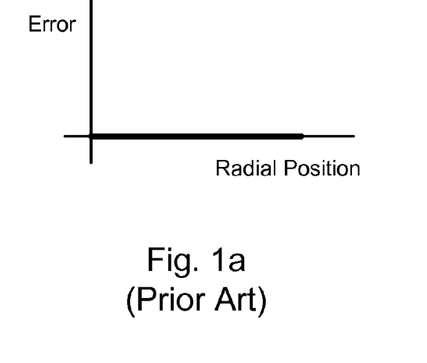
FIG. 1a is a timing diagram showing a position error as a function of radial location where disk wobble is zero.
Figure 1B:
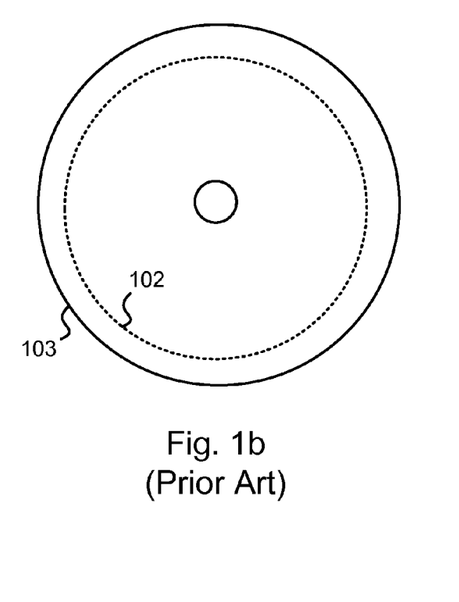
FIG. 1b shows an exemplary track that does not exhibit wobble.
Figure 1C:
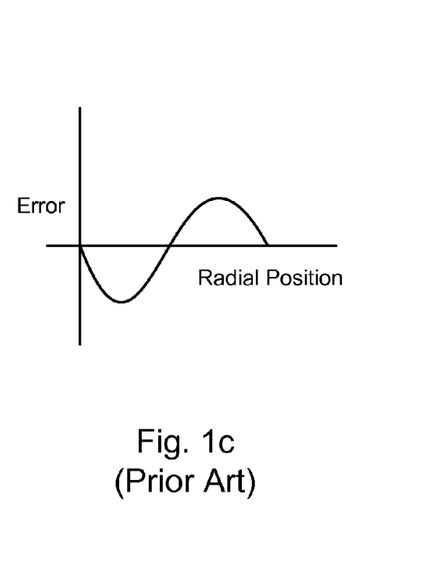
FIG. 1c is a timing diagram showing a position error as a function of radial location where disk wobble is non-zero.
Figure 1D:
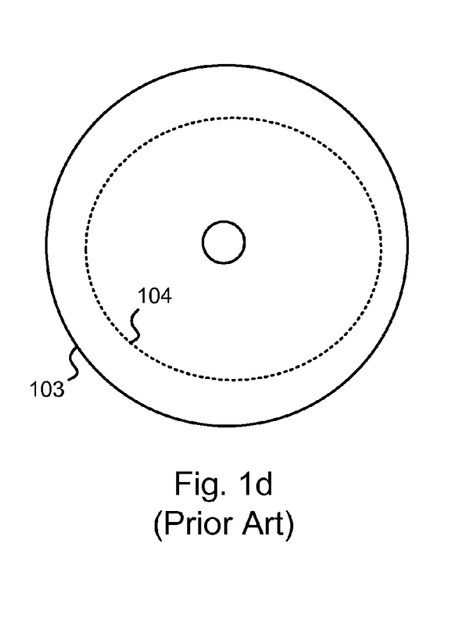
FIG. 1d shows an exemplary track that exhibits a periodic wobble.

FIGS. 1a-1d illustrate one form of RRO (termed a one "f" run out) that results from an imperfect spindle. FIG. 1a shows radial position versus error when the error is zero. The error will be zero when the read/write head assembly is tracking in a circular trajectory. FIG. 1b shows the read/write head assembly tracking a circular trajectory shown by the dashed circle 102 on disk 103. As shown in FIG. 1c, the error for one "f" run out varies as a function of the radial position, but the error at a given position repeats after one revolution of the disk. As shown in FIG. 1d, the head may track an oval path shown by the dashed path 104 on disk 103. This oval path results in what can be referred to as a "wobble" in the error signal. Since the wobble "repeats" itself from one revolution to another, techniques may be devised to compensate for the problem. By feeding positioning information about the repeatable error to servo control circuitry, the error may be corrected to position the head properly over the servo track. State of the art magnetic recording systems employ digital signal processing to detect servo data as opposed to older systems employing analog techniques.

Figure 2:
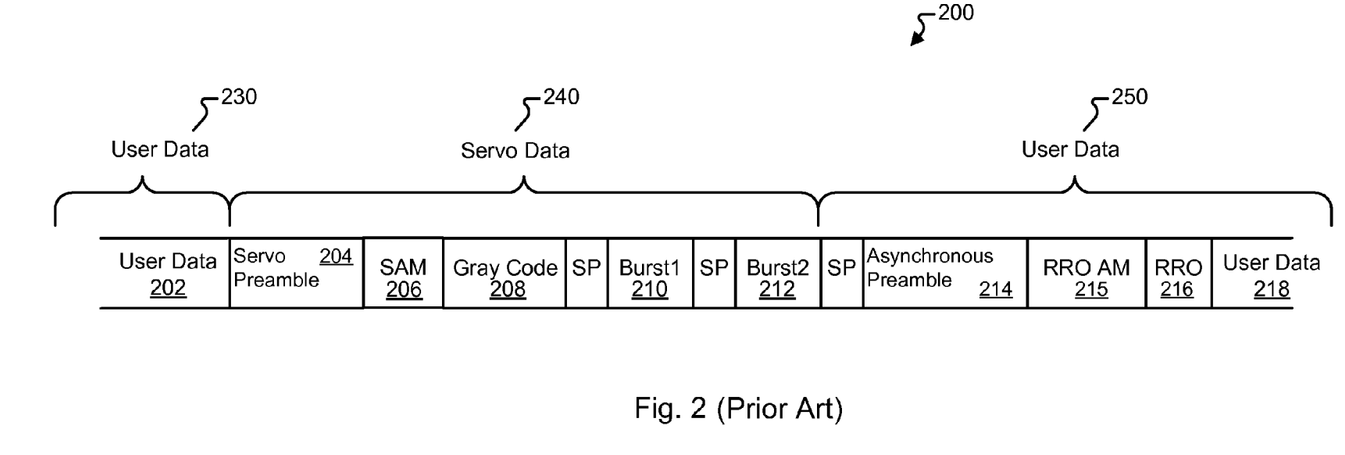
FIG. 2 depicts a prior art series of servo data followed by asynchronous RRO data.

Various systems have been developed to compensate for wobble that rely on writing a data pattern in the user data area that allows for detecting wobble in one or more regions of user data spread out around the disk. Such an approach includes writing a preamble pattern that is asynchronous to the sector data and allows for synchronizing to and detection of a subsequent RRO field. The RRO field is used to compensate for wobble. FIG. 2 depicts a data set 200 including both a servo data region 240 and user data regions 230, 250. User data region 230 includes user data 202, and user data region 250 includes user data 218 preceded by asynchronous RRO data. The asynchronous RRO data includes, among other things, an asynchronous preamble 214 and RRO address mark 215 used for synchronizing to subsequent RRO data 216. Servo data region 240 includes a servo preamble 204, a servo address mark 206, a Gray code 208 and burst fields 210, 212. Various spacers (SP) may be interspersed in the fields to address timing concerns. Such an approach allows for wobble compensation, however, it involves appreciable overhead including an asynchronous preamble and an RRO address mark. Further, a spacer is often required between the end of the servo data region and the beginning of the asynchronous RRO data. This overhead reduces the usable bit density of a storage device.

Hence, for at least the aforementioned reasons, there exists a need in the art for advanced systems and methods for providing wobble compensation.

BRIEF SUMMARY OF THE INVENTION

The present inventions are related to detection of data in a communication system, and more particularly to detection of servo repeatable run out information from a channel.

Some embodiments of the present invention provide methods for performing synchronous wobble compensation processing. Such methods include providing a medium that includes a servo data region and a user data region. The servo data region includes a clock recovery pattern and a location pattern. A detectable pattern is written to the user data region a known number of bit periods from the location pattern. The detectable pattern is read back, and a fractional processing delay is calculated. Based at least on the fractional processing delay and a known number of bit periods from the location pattern to the end of the servo data region, a wobble compensation pattern is written an integral number of bit periods from the location pattern. In some instances of the aforementioned embodiments, the location pattern is a sector address mark, the clock recovery pattern is a preamble pattern, and the wobble compensation pattern is repeatable run out data. In some such cases, the clock recovery pattern and the preamble pattern are written to the medium using a first write head, and the repeatable run out data is written to the medium using a second write head.

In various instances of the aforementioned embodiments, writing the detectable pattern is synchronized to a sampling clock, and writing the wobble compensation pattern is synchronized to the sampling clock offset by a phase adjustment. In such cases, the phase adjustment is derived from the calculated fractional processing delay. The sampling clock is recovered using a digital phase lock loop circuit based upon the clock recovery pattern, and the phase adjustment is implemented by the digital phase lock loop circuit over one or more bit periods.

In one or more instances of the aforementioned embodiments, the methods further include recovering a sampling clock using a digital phase lock loop circuit and based on the clock recovery pattern, reading the location pattern using the sampling clock, and reading the detectable pattern using the sampling clock. A location of the location pattern and a location of the detectable pattern are calculated. In such cases, calculating the fractional processing delay includes subtracting the location of the detectable pattern from the location of the location pattern to generate a distance. The known number of bit periods from the location pattern is subtracted from the distance to yield the fractional processing delay.

Other embodiments of the present invention provide storage devices that include a storage medium having a servo data region and a user data region. The servo data region includes a sector address mark. A repeatable run out data pattern is written to the user data region an integral number of bit periods from a location of the sector address mark. The devices further include a read/write head assembly disposed in relation to the storage device, and a read channel device having a synchronous wobble compensation circuit operable to use the repeatable run out data to perform wobble compensation.

Yet other embodiments of the present invention provide systems for performing synchronous wobble compensation in a storage device. Such systems include a phase lock loop circuit that is operable to recover a sampling clock from a received clock recovery pattern. A first location identification circuit and a second location identification circuit are included. The first location identification circuit is operable to identify a first location corresponding to a location pattern, and the second location identification circuit is operable to identify a second location corresponding to a detectable pattern. A fractional processing delay calculation circuit is included that is operable to calculate a fractional processing delay between the second location and the first location. The phase lock loop circuit is further operable to adjust the phase of the sampling clock an amount corresponding to the fractional processing delay. A wobble compensation pattern writing circuit is included that writes a wobble compensation pattern synchronous to the phase adjusted sampling clock. In some instances of the aforementioned embodiments, clock recovery pattern is a servo preamble pattern, the location pattern is a sector address mark, and the wobble compensation pattern is a repeatable run out pattern. In some such instances, a storage medium is included that has a user data region and a servo data region. The sector address mark and the servo preamble are located in the servo data region, and the repeatable run out pattern is written to the user data region. The servo preamble pattern and the sector address mark may written to the medium using a first write head, and the repeatable run out data may be written to the medium using a second write head. In some cases, the systems further include a repeatable run out processing circuit that is operable to receive the repeatable run out pattern using the same phase of the sampling clock used to receive the sector address mark.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to detection of data in a communication system, and more particularly to detection of servo repeatable run out information from a channel.

Various embodiments of the present invention provide overhead efficient disk wobble compensation. Because the servo data region in prior art devices is typically written at the time of disk manufacture and the asynchronous RRO data is written at a later time and using the read/write head assembly incorporated in the final storage device which may not be the same write head as was used to write the servo data region, the timing information that may be derived from the servo data sector is not typically useful in obtaining and using the RRO data. The asynchronous nature of the RRO data requires considerable overhead to allow processing. This overhead may include, for example, a preamble and sector address mark written in the user data region and used to synchronize to RRO data occurring subsequent to the preamble and sector address mark. Such overhead may consume many tens of bit periods, thus limiting the useable bit density of a storage device. Some embodiments of the present invention render this overhead unnecessary by synchronizing the writing of RRO data to the servo data that was previously written during disk manufacture. In some cases, the sector address mark of the servo data provides a time reference from which a desired location of an RRO data write can be identified. In some cases, the RRO data is written shortly after the end of the last field of burst information in the servo data field as predicted by the location of the servo address mark. In particular instances of the aforementioned embodiments, the synchronous RRO data is written within thirty bit periods of the end of the servo data. In other instances of the aforementioned embodiments, the synchronous RRO data is written within twenty bit periods of the end of the servo data. In yet other instances of the aforementioned embodiments, the synchronous RRO data is written within ten bit periods of the end of the servo data. These bit periods are identified as a spacer in the overall data pattern.

Figure 3:
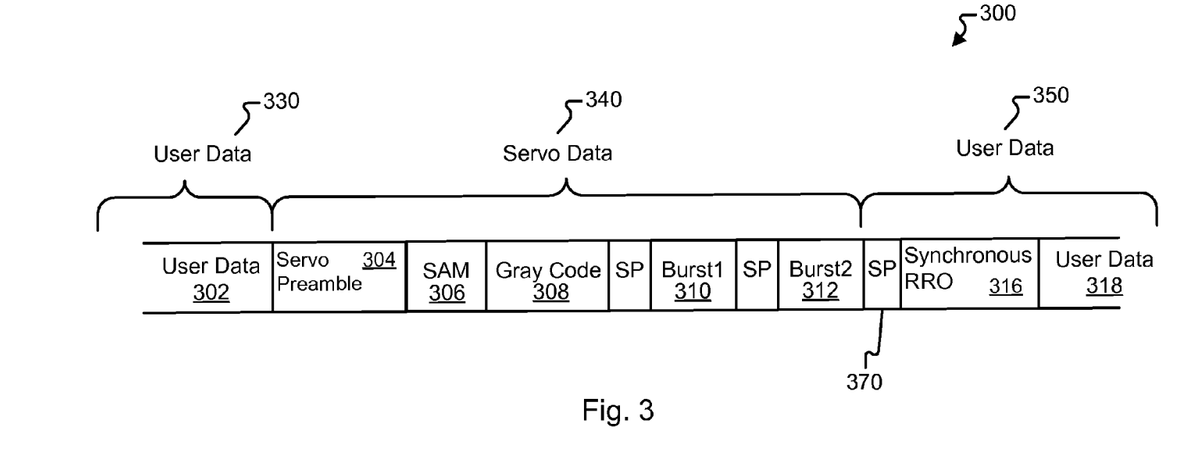
FIG. 3 depicts a series of servo data followed by synchronous RRO data in accordance with various embodiments of the present invention.

Such a write of synchronous RRO data results in a data set 300 as set forth in FIG. 3. Data set 300 includes both a servo data region 340 and user data regions 330, 350. Servo data region 340 includes a servo preamble 304, a servo address mark 306, a Gray code 308 and burst fields 310, 312 as are known in the art. User data region 330 includes user data 302, and user data region 350 includes user data 318 preceded by synchronous RRO data 316. Because the RRO data is synchronous, the overhead needed to obtain and process the RRO data is minimized. In some cases, the overhead is limited to a spacer 370 between the last burst field 312 of servo data 340 and synchronous RRO data 316. In some cases, spacer 370 is substantially shorter than a preamble and sector address mark that would be necessary had the RRO data been written asynchronously. Further, in some cases, spacer 370 exhibits approximately zero length.

Figure 4:
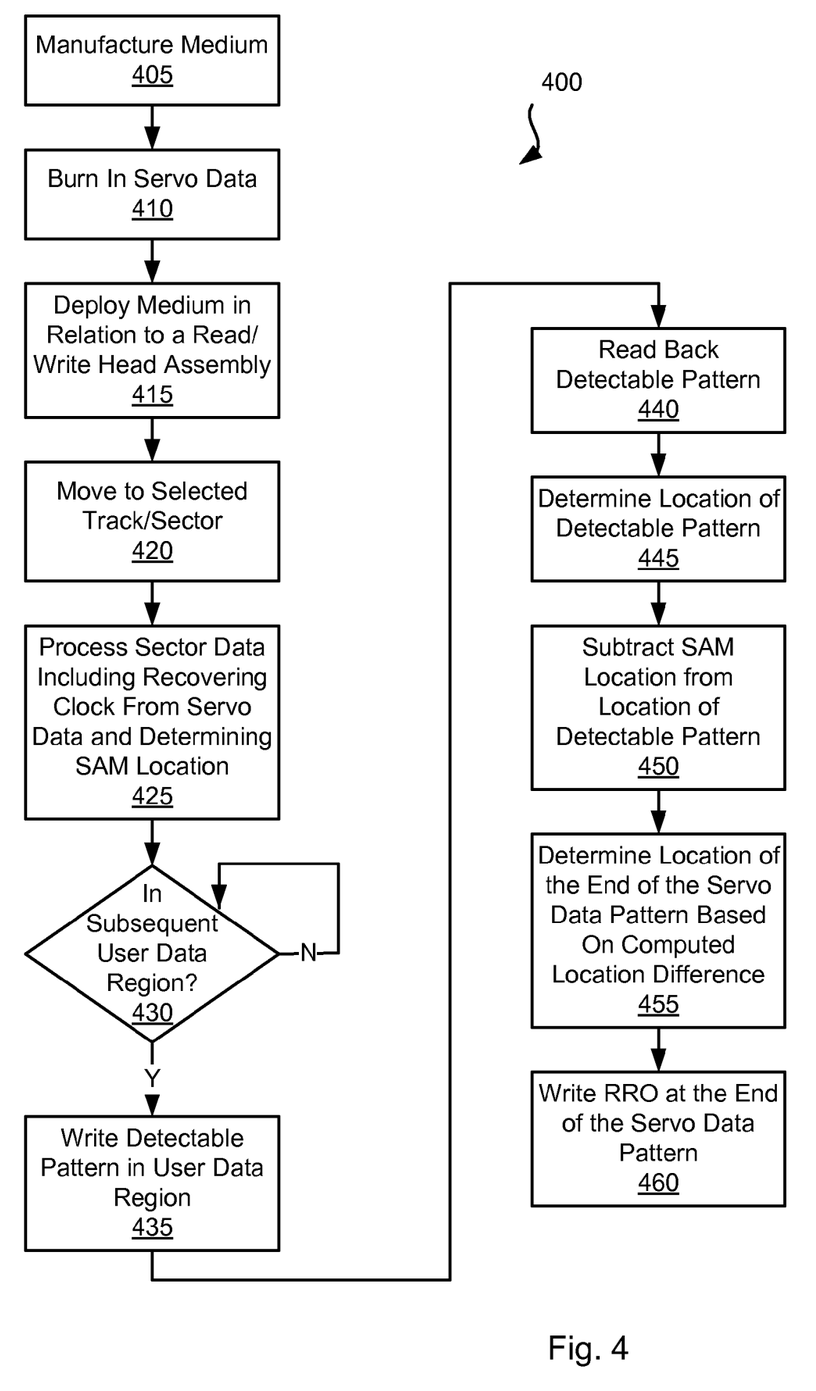
FIG. 4 is a flow diagram showing a method in accordance with some embodiments of the present invention for synchronously writing RRO data in accordance with some embodiments of the present invention.

Turning to FIG. 4, a flow diagram 400 shows a method in accordance with some embodiments of the present invention for synchronously writing RRO data in accordance with some embodiments of the present invention. Following flow diagram 400, a medium is manufactured (block 405). This includes, for example, creating a disk platter for a hard disk drive as is known in the art. A burn in process is then performed to write servo data patterns within wedges distributed around the disk platter (block 410). The wedges are placed at various locations around the disk platter and can be used to identify location of a read/write head assembly in relation to the disk platter as is known in the art. The disk platter including the burned in servo data is then installed in a storage device in relation to a read/write head assembly (block 415).

Figure 5:
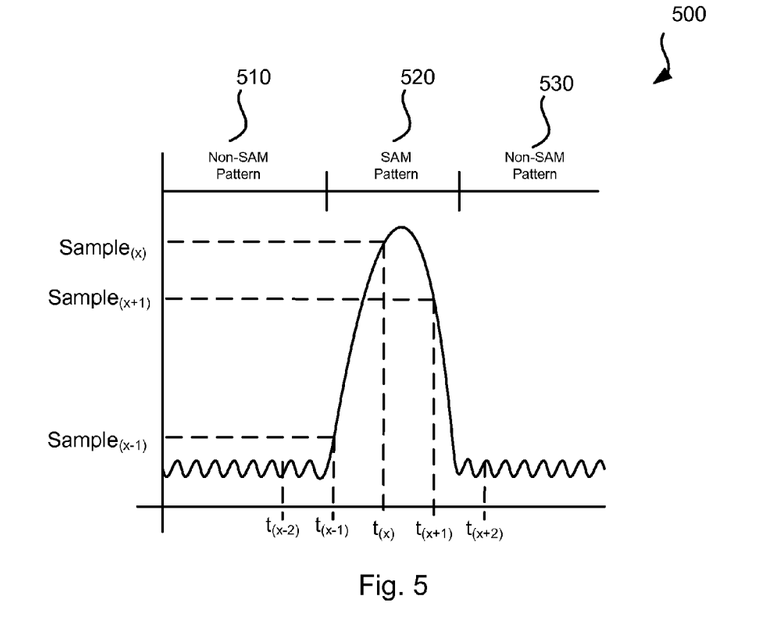
FIG. 5 is a timing diagram illustrating the process for determining sector address mark location that may be used in accordance with different embodiments of the present invention.

The disk platter is then moved in relation to the read/write head assembly to a selected track/sector using positioning processes known in the art (block 420). Once at the selected location (block 420), servo data for the sector is received and processed (block 425). This includes querying a received data stream for a servo preamble from which a sampling clock is recovered. The recovered sampling clock is then used to sample and process a subsequent sector address mark. A fractional location of the sector address mark is established as part of processing the sector address mark. FIG. 5 is a timing diagram 500 that illustrates a process for determining fractional sector address mark location that may be used in relation to different embodiments of the present invention. In particular, in a period 510 before the pattern corresponding to a sector address mark is received, the signal level provided by a sector address mark detector circuit is relatively low. Once the sector address mark is detected during a SAM pattern period 520 the signal level provided by the sector address mark detector circuit increases. During SAM pattern period 520, the signal from the sector address mark detector circuit is sampled one or more times (e.g., at times t(x−1), t(x) and t(x+1)). The integer location of the sector address mark is defined to be the location (i.e., time periods from a reference point) where the signal from the sector address mark detector circuit exhibits its highest value. A more refined fractional sector address mark location value is determined by calculating the location of the maximum value of the signal from the sector address mark detector based on the highest sample value and the two sample values on either side of the highest sample value (e.g., sample(x) corresponding to t(x), sample (x−1) corresponding to t(x−1), and sample(x+1) corresponding to t(x+1)) in accordance with the following equation:

$$\phi 1 = \frac{\text{sample}(x-1) + \text{sample}(x+1)}{2 * \text{sample}(x)}.$$

The fractional sector address mark location is then calculated by adding the fractional sector address mark location value to the location corresponding to the highest sample value (e.g., t(x)) to yield the actual sector address mark location according to the following equation:

Actual SAM location=$\phi 1$, where t(x) is defined to be zero. However, due to processing delays, the sector address mark will actually be detected later in accordance with the following equation:

Detected SAM location=$\phi 1$+Read Latency, where Read Latency is the time delay from when the data corresponding to the sector address mark is accessed until it is identified as part of the sector address mark.

After the sector address mark location is determined (block 425), the remaining portions of the servo data are processed. This includes processing the Gray code and burst information as is known in the art. Once it is determined that the servo data processing has completed (e.g., at the end of processing the burst information)(block 430), a detectable pattern is written somewhere in the user data region that follows the sector data (block 435). In contrast to the burned in servo data, the detectable pattern is written to the storage medium using the read/write head assembly a known number of bit periods from the location of the sector address mark. As such, the actual location at which the detectable pattern is written is the known integer number of bit periods from the servo address mark (i.e., First Integer Bit Periods) as defined by the following equation:

Expected Write Location=Detected SAM Location+ First Integer Bit Periods.

The actual write location will be delayed due to the write latency, or time between when a write command is issued and the write actually occurs as described by the following equation:

Actual Write Location=Detected SAM Location+First Integer Bit Periods+WriteLatency.

The detectable pattern may be any pre-defined pattern that may be written and later retrieved from the storage medium. In one particular embodiment of the present invention, the detectable pattern is the same as the servo preamble. In other embodiments of the present invention, the detectable pattern is the same as the servo address mark. Based upon the disclosure provided herein, one of ordinary skill in the art will appreciate a variety of patterns that may be used as the detectable pattern in accordance with different embodiments of the present invention. In one particular embodiment of the present invention, the detectable pattern includes a preamble followed by a servo address mark similar to that included in the servo data region.

The detectable pattern may then be read back using the normal read process of the storage device in which the storage medium is deployed (block 440). The clock recovered from the servo preamble is used to perform the read back of the detectable pattern. Once the detectable pattern is received, a location corresponding to the detectable pattern is calculated. The fractional location of the detectable pattern may be calculated using digital interpolation similar to that described above in relation to FIG. 5 above. The fractional location information of the detectable pattern may also be obtained by using the timing recovery circuit to acquire the best sampling phase for the detectable pattern and comparing the detectable pattern sampling phase with the sampling phase which was previously acquired for the sector address mark in the servo data field. The location of the detectable pattern is described in the following equation:

Detectable Pattern Location=Detected SAM Location+First Integer Bit Periods+Write Latency A distance from the detectable pattern to the earlier identified sector address mark is then calculated by subtracting the location of the sector address mark from the location of the detectable pattern (block 450). As a read of the sector address mark and the detectable pattern are done using the same read/write head assembly, the read latency will be the same for both and can therefore be ignored when calculating the distance between the sector address mark and the detectable pattern. The following equation describes the distance calculation:

Calculated Distance=First Integer Bit Periods+Write Latency.

From this, the write latency can be calculated in accordance with the following equation:

Write Latency=Calculated Distance−First Integer Bit Periods.

In some embodiments of the present invention, the write latency is represented with a granularity of one eighth of a bit period (i.e., T/8). Knowing the write latency allows for accurate placement of an RRO pattern an integer distance from the sector address mark shortly after the end of the servo data region. It should be noted that delays other than write latency may be incorporated into the above mentioned equation. Thus, the above mentioned equation may be more generically written as:

Processing Delay=Calculated Distance−First Integer Bit Periods.

The location of the end of the servo data region is a known distance from the servo address mark defined during manufacture of the disk platter (i.e., Second Integer Bit Periods). With this information, the timing for when to write the synchronous RRO data after the end of the servo data region can be calculated in accordance with the following equation:

RRO Write Location=Second Integer Bit Periods−Processing Delay (block 455). In some cases, the value of the Processing delay is minimized by assuring that it is never greater than one half of a bit period (i.e., T/2). To do so, the above mentioned equation can be broken into two equations as follow:

RRO Write Location=Second Integer Bit Periods−Processing Delay, for Processing Delay<=T/2; and RRO Write Location=Second Integer Bit Periods+1−(1−Processing Delay), for Processing Delay>T/2.

By subtracting the Processing Delay from the expected number of bit periods until the end of the servo data region, the RRO data can be written such that it is placed shortly after the servo data region at the beginning of the user data region (block 460). Such an approach places the RRO data an integer number of bit periods away from the servo address mark, and thus synchronous to the servo address mark. It should be noted that this process (blocks 420-460) may be repeated for each track/sector of a storage medium to provide RRO data that is synchronously placed a known distance from a sector address mark associated with the given track/sector of the storage medium.

In one particular embodiment of the present invention, the Processing Delay period is incorporated into the write period to a sampling clock phase control circuit such as a digital phase locked loop which is used to generate the sampling clock based on the servo preamble. By doing this, the same clock that is recovered from the servo preamble may be used to control the writing of the RRO data. By doing this, the write latency is accounted for during the writing of the RRO data. On a subsequent read of the RRO data, the RRO data will be an integer number of bit periods from the sector address mark location.

Figure 6:
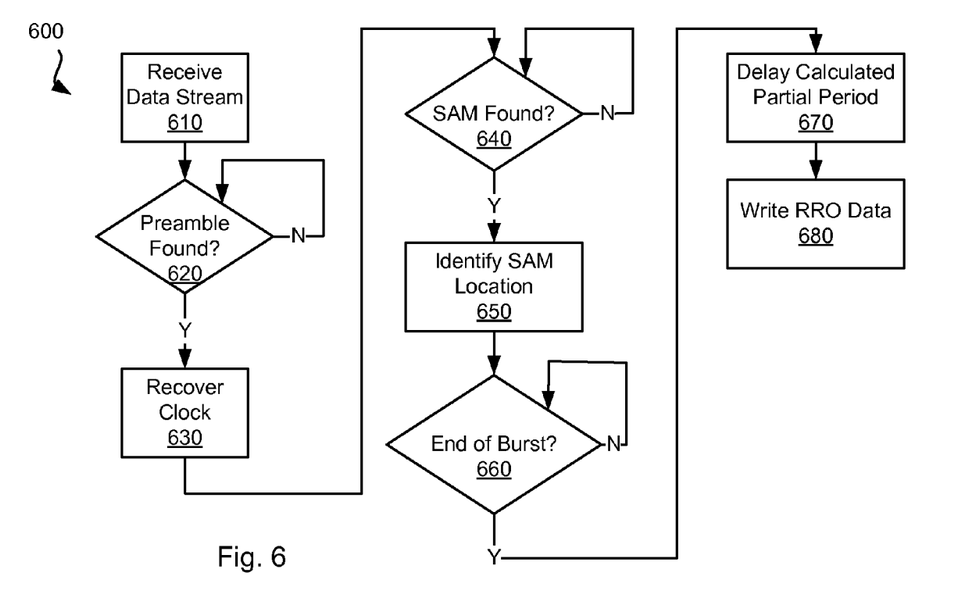
FIG. 6 is a flow diagram showing a method in accordance with some embodiments of the present invention for writing synchronous RRO data in a user data region of a storage medium.

Turning to FIG. 6, a flow diagram 600 depicts a method in accordance with some embodiments of the present invention for writing synchronous RRO data in a user data region of a storage medium. Following flow diagram 600, a data stream is received (block 610). This process may include receiving a series of digital samples representing information sensed from a storage medium. The received data stream is queried for a predefined preamble pattern from which a phase and/or frequency of a sampling clock may be recovered (block 620 and block 630). Such preamble detection and clock recovery may be done using processes known in the art for doing such. The process of querying for a preamble is continued until a preamble is found. Once the preamble is found (block 620), the data stream is queried for a predefined sector address mark (block 640). Querying for a sector address mark may be done using any process known in the art for detecting a sector address mark, and the process continues until either a sector address mark is found or a timeout condition is indicated. Once the sector address mark is found (block 640), a location of the identified sector address mark is established (block 650). In some cases, the location of the sector address may be an integral number of bit periods based on a sampling clock recovered through use of the preamble. In other cases, the location of the sector address mark may be an integral number of bit periods based on a sampling clock plus a fractional offset calculated using multiple samples and digital interpolation or using timing recovery phase information as discussed above in relation to FIG. 5.

The number of bit periods from the location of the sector address mark until the end of the servo data and beginning of the user data (e.g., the end of the burst information) is known and fixed during the manufacturing process. It is determined when the end of the servo data is reached (block 660). At this point, the process of writing synchronous RRO data to the upcoming user data region is prepared by delaying a time approximately equal to a calculated partial period (block 670). A described above in relation to FIG. 4, a Processing Delay is incurred between when a write command is issued and the actual time when the write process causes information to be stored to the medium. The calculated partial period is determined by subtracting the Processing Delay determined using the process of FIG. 4 by a bit period in accordance with the following equation:

Calculated Partial Period=Bit Period−Processing Delay.

Once the delay has passed (block 670), a write command for writing the RRO data is issued (block 680). By delaying the calculated partial period (block 670) before issuing the write command (block 680), the RRO data is stored to a location an integral number of bit periods from the location of the sector address mark. In one particular embodiment of the present invention, a delay corresponding to the Calculated Partial Period is implemented by providing an error feedback signal corresponding to the Processing Delay period to a digital phase lock loop circuit that is used to generate the sampling clock based on the servo preamble. Another integer number of bit periods is awaited for the sampling clock to stabilize before writing of the RRO data is initiated. By doing this, the same clock that is recovered from the servo preamble is adjusted to account for the write latency and is used to control the writing of the RRO data. On a subsequent read of the RRO data, the RRO data will be an integer number of bit periods (i.e., is synchronously located) from the sector address mark location. Such synchronous processing ability removes the need for an RRO preamble and other overhead to precede the actual RRO data.

In some cases, the process of flow diagram 600 may be modified to implement a spacer between the end of the servo data and the beginning of the synchronous RRO data written in the subsequent user data area. In particular, block 660 may be adjusted to delay one or more bit periods beyond that discussed above. This may be useful to assure that an overwrite of the last bit period of the burst information does not occur and/or to assure sufficient time to implement the burst demodulation before beginning any adjustment of the sampling clock before writing the RRO data. It should be noted that in some cases the read head in a read/write head assembly precedes the write head by a number of bit periods. In some cases, the number of bit periods required to stabilize the sampling clock is approximately equal to the distance between the write head and the read head making it possible to reduce or eliminate the length of the spacer on the disk media.

Figure 7:
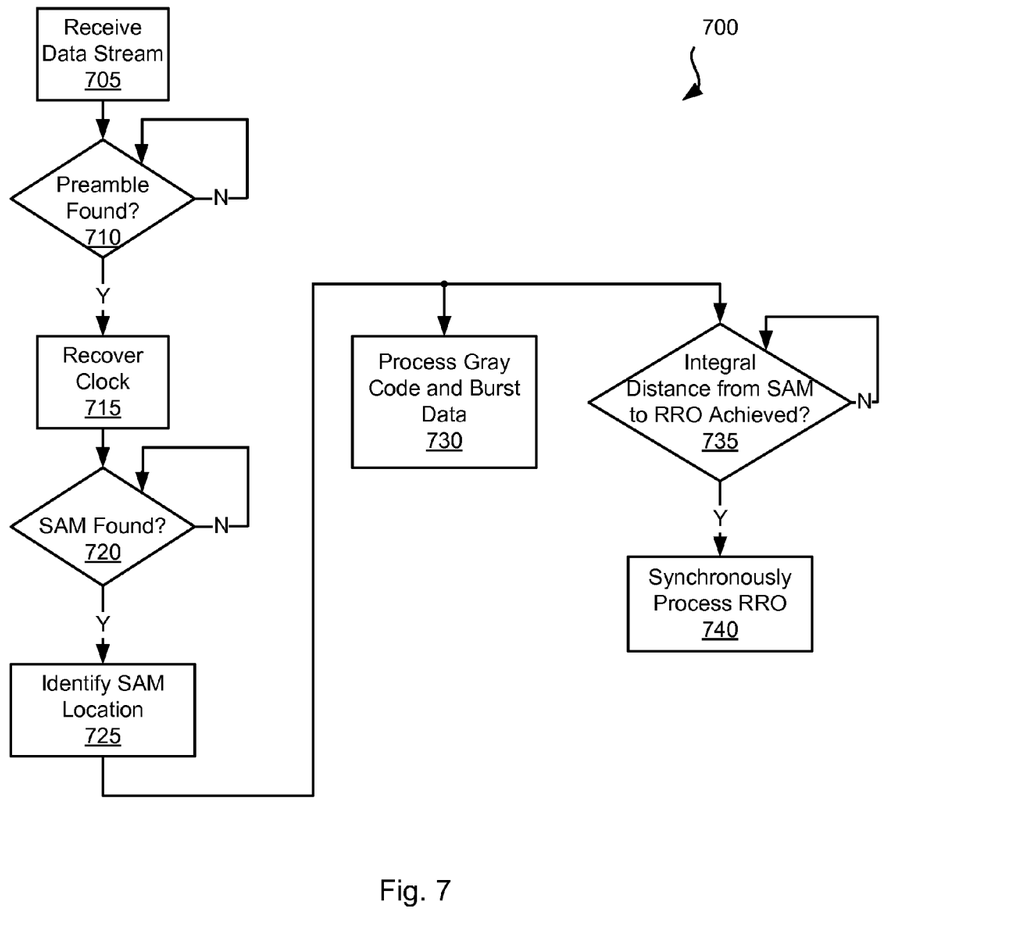
FIG. 7 is a flow diagram showing synchronous RRO processing in accordance with some embodiments of the present invention.

Turning to FIG. 7 a flow diagram showing synchronous RRO processing in accordance with some embodiments of the present invention is presented. Following flow diagram 700, a data stream is received (block 705). This process may include receiving a series of digital samples representing information sensed from a storage medium. The received data stream is queried for a predefined preamble pattern from which a phase and/or frequency of a sampling clock may be adjusted (block 710 and block 715). Such preamble detection and clock recovery may be done using processes known in the art for doing such. The process of querying for a preamble is continued until a preamble is found. Once the preamble is found (block 710), the data stream is queried for a predefined sector address mark (block 720). Querying for a sector address mark may be done using any process known in the art for detecting a sector address mark, and the process continues until either a sector address mark is found or a timeout condition is indicated. Once the sector address mark is found (block 720), a location of the identified sector address mark is established (block 725). In some cases, the location of the sector address may be an integral number of bit periods based on a sampling clock recovered through use of the preamble. In other cases, the location of the sector address mark may be an integral number of bit periods based on a sampling clock plus a fractional offset which may be calculated using one of the methods previously discussed.

At this point, the Gray code and burst information subsequent to the sector address mark is processed (block 730). This processing may be done using approaches for processing Gray code and burst information that are known in the art. In addition, it is determined whether a defined integral number of bit periods from the location of the sector address mark to the RRO have passed (block 735). The determined number of bit periods corresponds to the synchronous location where the RRO data was written as more fully described above in relation to FIG. 6. Where the determined number of bit periods has passed (block 735), the data being received corresponds to the previously written synchronous RRO data that is processed (block 740). In particular, the RRO data is used to compensate for wobble using wobble compensation approaches that are known in the art.

Figure 8:
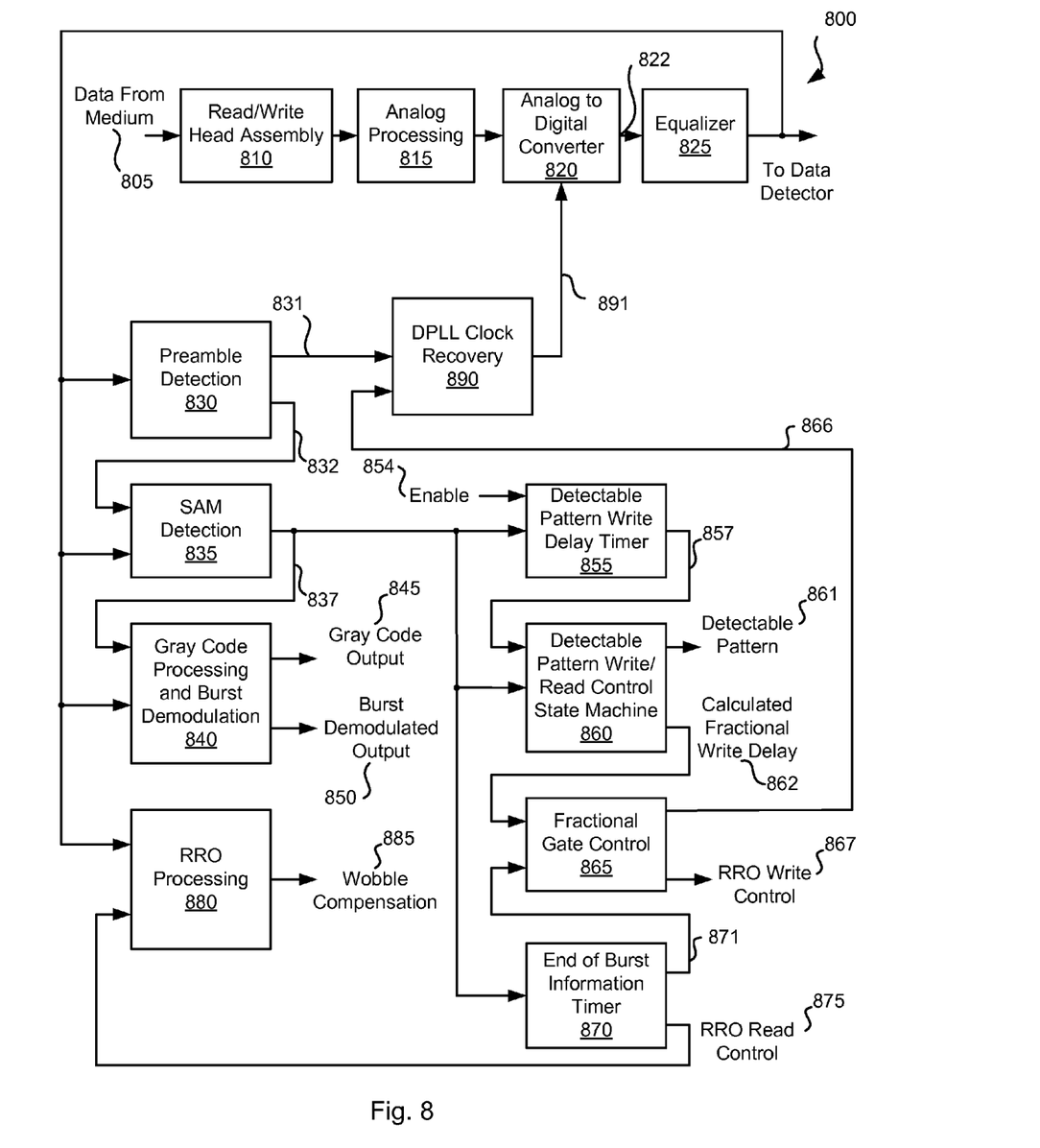
FIG. 8 is a block diagram of a synchronous RRO processing circuit in accordance with various embodiments of the present invention.

Turning to FIG. 8, a block diagram of a synchronous RRO processing circuit 800 is shown in accordance with various embodiments of the present invention. Synchronous RRO processing circuit 800 includes a read/write head assembly 810 that writes data to a medium and senses data stored on the medium 805. Read/write head assembly 810 provides an analog signal corresponding to the sensed information to an analog processing circuit 815, and analog processing circuit 815 provides a processed analog output to an analog to digital converter 820. Read/write head assembly 810 and analog processing circuit 815 may be implemented using circuits and technology known in the art. Analog to digital converter 820 provides a series of digital samples 822 obtained synchronous to a sampling clock 891 and corresponding to data from the medium 805. Analog to digital converter 820 may be any analog to digital converter known in the art. Digital samples 822 are provided to a digital equalizer 825. Digital equalizer 825 may be any equalizer known in the art. In one particular embodiment of the present invention, digital equalizer 825 is implemented as a finite impulse response filter as are known in the art. Digital equalizer 825 provides an equalized series of samples to a data detector (not shown).

The output from digital equalizer 825 is additionally provided to a preamble detection circuit 830. Preamble detection circuit 830 provides a feedback signal 831 to a digital phase lock loop circuit 890 that operates to recover sampling clock 891 based on the received preamble information. The clock recovery includes adjusting the phase and/or frequency of sampling clock 891 so that it matches the phase and frequency of the received preamble. Digital phase lock loop circuit 890 may be any digital phase lock loop circuit known in the art that is capable of adjusting a sampling clock. Sampling clock 891 defines the "bit periods" that synchronize operation of the rest of synchronous RRO processing circuit 800. When a preamble is detected, a signal 832 is asserted. At this point, a sector address mark detection circuit 835 queries the series of samples from equalizer 825 for a sector address mark. Sector address mark detection circuit 835 may be any sector address mark detection circuit known in the art that is capable if identifying a sector address mark and providing a location of the identified sector address mark. Once found, a signal 837 including an indication that the sector address mark was found along with a location of the sector address mark is provided. A Gray code processing and burst demodulation circuit 840 processes subsequent information in the servo data field based on an offset from the identified sector address mark. Such processing results in production of a Gray code output 845 and a burst demodulated output 850 as are known in the art. Gray code processing and burst demodulation circuit 840 may be any circuit known in the art that is capable of processing Gray code and performing burst demodulation.

In addition, signal 837 indicating the identified sector address mark and the location thereof are provided to circuitry that is used for both writing a synchronous RRO pattern and reading the synchronous RRO pattern. In particular, when enabled, a detectable pattern write delay timer 855 starts running when the sector address mark is found. Detectable pattern write delay timer 855 is used to identify a location within the user data where a detectable pattern is to be written. In one embodiment of the present invention, detectable pattern write delay timer 855 is a pre-loadable down counter that is loaded with a number corresponding to a number of bit periods of the sample clock where a dateable pattern is to be written. The pre-loaded number is selected based on the known length of the servo data such that the detectable pattern is written in the user data region following the servo data. Detectable pattern write delay timer 855 is then decremented once for each bit period (synchronous to the sample clock recovered by preamble detection/clock recovery circuit 830) until it reaches zero. At this point, a signal 857 is asserted causing a detectable pattern write/read control state machine 860 to begin writing a detectable pattern 861 to a storage medium (not shown).

On a subsequent pass, the preceding preamble detection, Gray code processing and burst processing are repeated for the same servo data. Once the sector address mark is detected as indicated by sector address mark detection circuit 835, detectable pattern write delay timer 855 again begins counting the time until the location of the previously written detectable pattern should be present in the data stream. Once signal 857 is asserted, detectable pattern write/read control state machine interpolates the subsequent samples corresponding to the received detectable pattern to identify an exact location of detectable pattern 861. Any digital interpolation technique known in the art may be used to determine the location. In some embodiments of the present invention, the interpolation is capable of determining a location within one-eighth of a bit period (i.e., T/8). This calculated fractional write delay 862 (e.g., the Processing Delay of FIG. 4) is provided to a fractional gate control circuit 865.

On a subsequent pass, the preceding preamble detection, Gray code processing and burst processing are repeated for the same servo data. Once the sector address mark is detected as indicated by sector address mark detection circuit 835, an end of burst information timer 870 begins counting an integral umber of bit periods. The integral number of bit periods corresponds to the known number of bit periods between the location of the servo address mark and the end of the servo data. Once the integral number of bit periods is exceeded, a signal 871 is asserted. Once signal 871 is asserted, a feedback signal 866 is asserted that causes digital phase lock loop circuit 890 to start adjusting the phase of sampling clock 891 such that the phase of the sampling clock is moved an amount corresponding to calculated fractional delay 862. This adjustment may be implemented over the course of a number of bit periods until sampling clock 891 is stable at the desired delayed phase. In one embodiment of the present invention, the number of bit periods over which the phase shift is implemented is a predefined number between zero and thirty depending upon the particular implementation. In some cases, where calculated fractional write delay 862 is more than one half of a bit period (i.e., T/2), the delay is adjusted to be (1−T/2) and the number loaded in end of burst information timer 870 is incremented by one. In this way, the phase sampling clock never has to be adjusted by more than T/2 assuring a quicker settling time. Once the defined period for allowing stabilization of sampling clock 891 has passed, an RRO write control signal 867 is asserted. Assertion of RRO write control signal 867 initiates the writing of the defined RRO data to the storage medium.

On a subsequent pass, with the RRO data written synchronous to sampling clock 891, the preceding preamble detection, Gray code processing and burst processing are repeated for the same servo data. Once the sector address mark is detected as indicated by sector address mark detection circuit 835, an end of burst information timer 870 begins counting an integral number of bit periods. The integral number of bit periods corresponds to the known number of bit periods between the location of the servo address mark and the location where the synchronous RRO data was written. Once the integral number of bit periods is exceeded, RRO read control signal 875 is asserted. RRO read control signal 875 causes samples received from equalizer 825 to be processed by an RRO processing circuit. RRO processing circuit may be any circuit known in the art for generated a wobble compensation signal 885 based on RRO data received from a medium.

Figure 9:
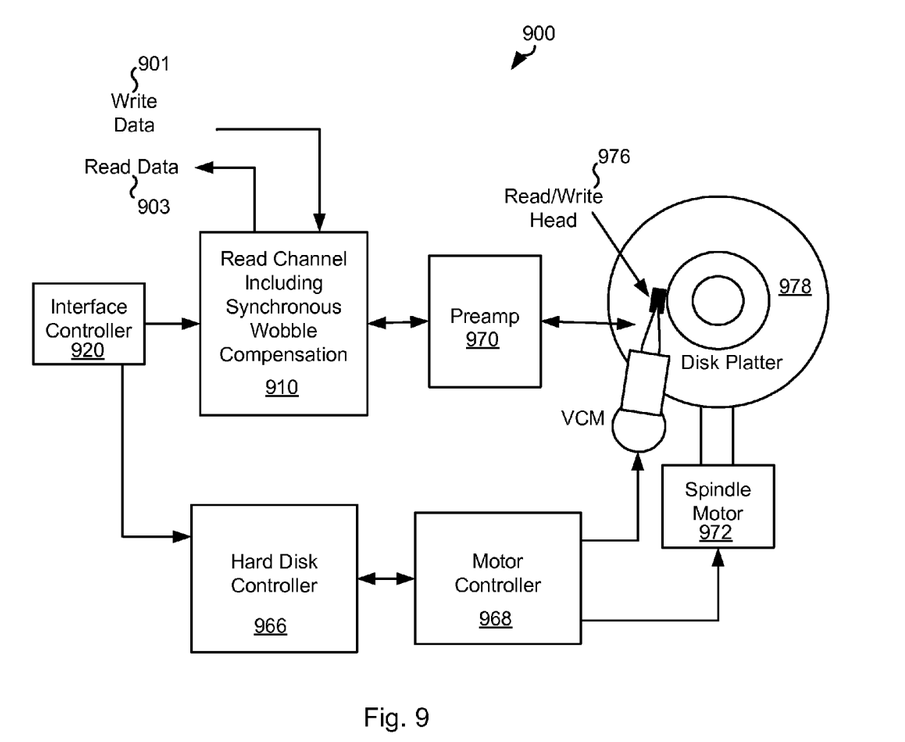
FIG. 9 is a storage system including a read channel with synchronous wobble compensation is depicted in accordance with various embodiments of the present invention.

Turning to FIG. 9, a storage system 900 including a read channel 910 with synchronous wobble compensation is depicted in accordance with various embodiments of the present invention. Storage system 900 may be, for example, a hard disk drive. Read channel 910 includes a synchronous wobble compensation system similar to that described above in relation to FIG. 8. Further, read channel 910 includes a data detector, such as, for example, a Viterbi algorithm data detector. In addition to read channel 910, storage system 900 includes a preamplifier 970 that amplifies a minute electrical signal received from a read/write head assembly 976. Read/write head assembly is disposed in relation to a disk platter 978. Storage system 900 also includes an interface controller 920, a hard disk controller 966, a motor controller 968, and a spindle motor 972. Interface controller 920 controls addressing and timing of data to/from disk platter 978. The data on disk platter 978 consists of groups of magnetic signals that may be detected by read/write head assembly 976 when the assembly is properly positioned over disk platter 978. In one embodiment, disk platter 978 includes magnetic signals recorded in accordance with a perpendicular recording scheme. In other embodiments of the present invention, disk platter 978 includes magnetic signals recorded in accordance with a longitudinal recording scheme.

In a typical read operation, read/write head assembly 976 is accurately positioned by motor controller 968 over a desired data track on disk platter 978. Motor controller 968 both positions read/write head assembly 976 in relation to disk platter 978 and drives spindle motor 972 by moving read/write head assembly to the proper data track on disk platter 978 under the direction of hard disk controller 966. Spindle motor 972 spins disk platter 978 at a determined spin rate (RPMs). Once read/write head assembly 978 is positioned adjacent the proper data track, magnetic signals representing data on disk platter 978 are sensed by read/write head assembly 976 as disk platter 978 is rotated by spindle motor 972. The sensed magnetic signals are provided as a continuous, minute analog signal representative of the magnetic data on disk platter 978. This minute analog signal is transferred from read/write head assembly 976 to read channel 910 via preamplifier 970. Preamplifier 970 is operable to amplify the minute analog signals accessed from disk platter 978. In turn, read channel 910 decodes and digitizes the received analog signal to recreate the information originally written to disk platter 978. This data is provided as read data 903 to a receiving circuit. A write operation is substantially the opposite of the preceding read operation with write data 901 being provided to read channel module 910. This data is then encoded and written to disk platter 978. In addition, read channel 910 writes RRO data synchronous to servo data dispersed on disk platter 910. This synchronous RRO data may be read, and one of a variety of approaches known in the art for deriving wobble compensation based on the RRO data may be performed.

In conclusion, the invention provides novel systems, devices, methods and arrangements for low overhead disk wobble compensation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for performing synchronous wobble compensation processing, the method comprising:
providing a medium including a servo data region and a user data region, wherein the servo data region includes a clock recovery pattern and a location pattern;
writing a detectable pattern in the user data region a first known number of bit periods from the location pattern;
reading the detectable pattern;
calculating a fractional processing delay; and
based at least in part on the fractional processing delay and a second known number of bit periods from the location pattern to the end of the servo data region, writing a wobble compensation pattern a whole number of bit periods from the location pattern, wherein the whole number of bit periods corresponds to a single point.

2. The method of claim 1, wherein the location pattern is a sector address mark and wherein the clock recovery pattern is a preamble pattern.

3. The method of claim 2, wherein the wobble compensation pattern is repeatable run out data.

4. The method of claim 3, wherein the clock recovery pattern and the sector address mark are written to the medium using a first write head, and wherein the repeatable run out data is written to the medium using a second write head.

5. The method of claim 1, wherein writing the detectable pattern is synchronized to a sampling clock, and wherein writing the wobble compensation pattern is synchronized to the sampling clock offset by a phase adjustment.

6. The method of claim 5, wherein the phase adjustment is derived from the calculated fractional processing delay.

7. The method of claim 6, wherein the sampling clock is recovered using a digital phase lock loop circuit based upon the clock recovery pattern, and wherein the phase adjustment is implemented by the digital phase lock loop circuit over one or more bit periods.

8. The method of claim 1, wherein the method further comprises:
recovering a sampling clock using a digital phase lock loop circuit and based on the clock recovery pattern;
reading the location pattern using the sampling clock; and
reading the detectable pattern using the sampling clock.

9. The method of claim 8, wherein the method further comprises:
calculating a location of the location pattern; and
calculating a location of the detectable pattern.

10. The method of claim 9, wherein calculating the fractional processing delay includes:
subtracting the location of the detectable pattern from the location of the location pattern to generate a distance, and subtracting the first known number of bit periods from the location pattern from the distance.

11. The method of claim 1, wherein the fractional processing delay includes a latency between when a write signal is issued until data is written to the storage medium.

12. A system for performing synchronous wobble compensation in a storage device, the system comprising:
a phase lock loop circuit, wherein the phase lock loop circuit is operable to recover a sampling clock from a received clock recovery pattern in a servo data region;
a first location identification circuit, wherein the first location identification circuit is operable to identify a first location corresponding to a location pattern;
a second location identification circuit, wherein the second location identification circuit is operable to identify a second location corresponding to a detectable pattern;
a fractional processing delay calculation circuit, wherein the fractional processing delay calculation circuit is operable to calculate a fractional processing delay between the second location and the first location, and wherein calculating the fractional processing delay between the second location and the first location includes subtracting the first location from the second location to generate a distance, and subtracting a known number of cycles of the sampling clock between the first location and the second location from the distance to yield the fractional processing delay;
wherein the phase lock loop circuit is operable to adjust the phase of the sampling clock an amount corresponding to the fractional processing delay; and
an wobble compensation pattern writing circuit, wherein the wobble compensation pattern writing circuit is operable to write a wobble compensation pattern synchronous to the phase adjusted sampling clock.

13. The system of claim 12, wherein the clock recovery pattern is a servo preamble pattern, wherein the location pattern is a sector address mark, and wherein the wobble compensation pattern is a repeatable run out pattern, and wherein the system further comprises:
a storage medium having the user data region and the servo data region, wherein the sector address mark and the servo preamble are located in the servo data region, and wherein the repeatable run out pattern is written to the user data region.

14. The system of claim 13, wherein the servo preamble pattern and the sector address mark are written to the medium using a first write head, and wherein the repeatable run out data is written to the medium using a second write head.

15. The system of claim 13, wherein the repeatable run out pattern is displaced an integral number of cycles of the sampling clock from the sector address mark.

16. The system of claim 15, wherein the system further comprises:
a repeatable run out processing circuit, wherein the repeatable run out processing circuit is operable to receive the repeatable run out pattern using the same phase of the sampling clock used to receive the sector address mark.

17. The system of claim 12, wherein the fractional processing delay includes a latency between when a write signal is issued until data is written to the storage medium.

18. The system of claim 12, wherein the system is implemented as part of a storage device.

19. The system of claim 12, wherein the system is implemented as part of an integrated circuit.

20. A system for performing synchronous wobble compensation in a storage device, the system comprising:
a first location identification circuit operable to identify a first location corresponding to a location pattern;
a second location identification circuit operable to identify a second location corresponding to a detectable pattern;
a fractional processing delay calculation circuit operable to calculate a fractional processing delay between the second location and the first location;
a clock recovery circuit operable to recover a sampling clock from a clock recovery pattern in a servo data region and to adjust the phase of the sampling clock an amount corresponding to the fractional processing delay to yield a phase adjusted sampling clock;
an wobble compensation pattern writing circuit operable to write a wobble compensation pattern in a user data region synchronous to the phase adjusted sampling clock, wherein the wobble compensation pattern is a repeatable run out pattern; and a repeatable run out processing circuit operable to receive the repeatable run out pattern using the same phase of the sampling clock used to receive the sector address mark.

21. The system of claim 20, wherein the system is implemented as part of a storage device.

22. The system of claim 21, wherein the storage device comprises;

a storage medium having the user data region and the servo data region, wherein the wobble compensation pattern is a repeatable run out pattern in the user data region.

23. The system of claim 20, wherein the system is implemented as part of an integrated circuit.

24. The system of claim 20, wherein the clock recovery pattern precedes the sector address mark in the user data region.

25. The system of claim 20, wherein calculating the fractional processing delay between the second location and the first location comprises:

subtracting the first location from the second location to generate a distance, and subtracting a known number of cycles of the sampling clock between the first location and the second location from the distance to yield the fractional processing delay.

26. The system of claim 25, wherein the fractional processing delay includes a latency between when a write signal is issued until data is written to a storage medium.

27. The system of claim 20, wherein the servo data region further includes a sector address mark, and wherein the wobble compensation pattern is displaced an integral number of cycles of the sampling clock from the sector address mark.

* * * * *